Figure 1:
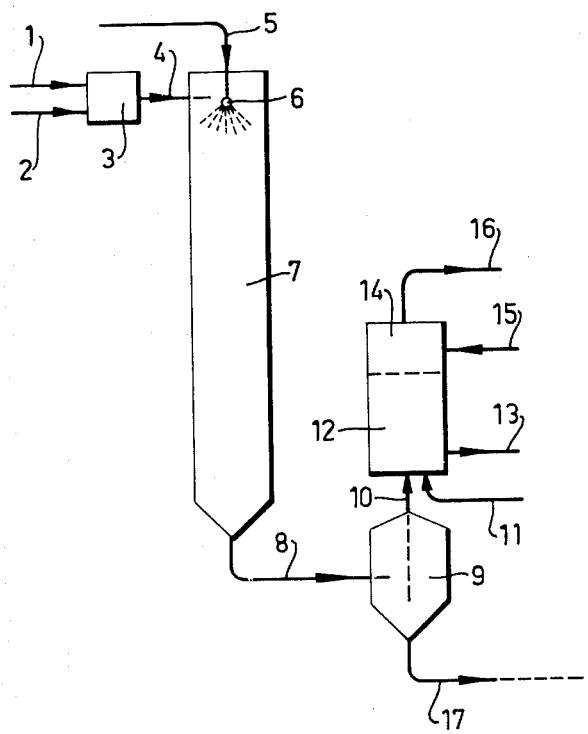

Feb. 22, 1966   R. B. REINHALL ETAL   3,236,589
METHOD OF WORKING UP CELLULOSE WASTE
LIQUOR CONTAINING SODIUM AND SULFUR
Filed Jan. 31, 1962   4 Sheets-Sheet 1

INVENTORS.
ROLF BERTIL REINHALL
BERTIL SIXTEN GROTH

INVENTORS.
ROLF BERTIL REINHALL
BERTIL SIXTEN GROTH

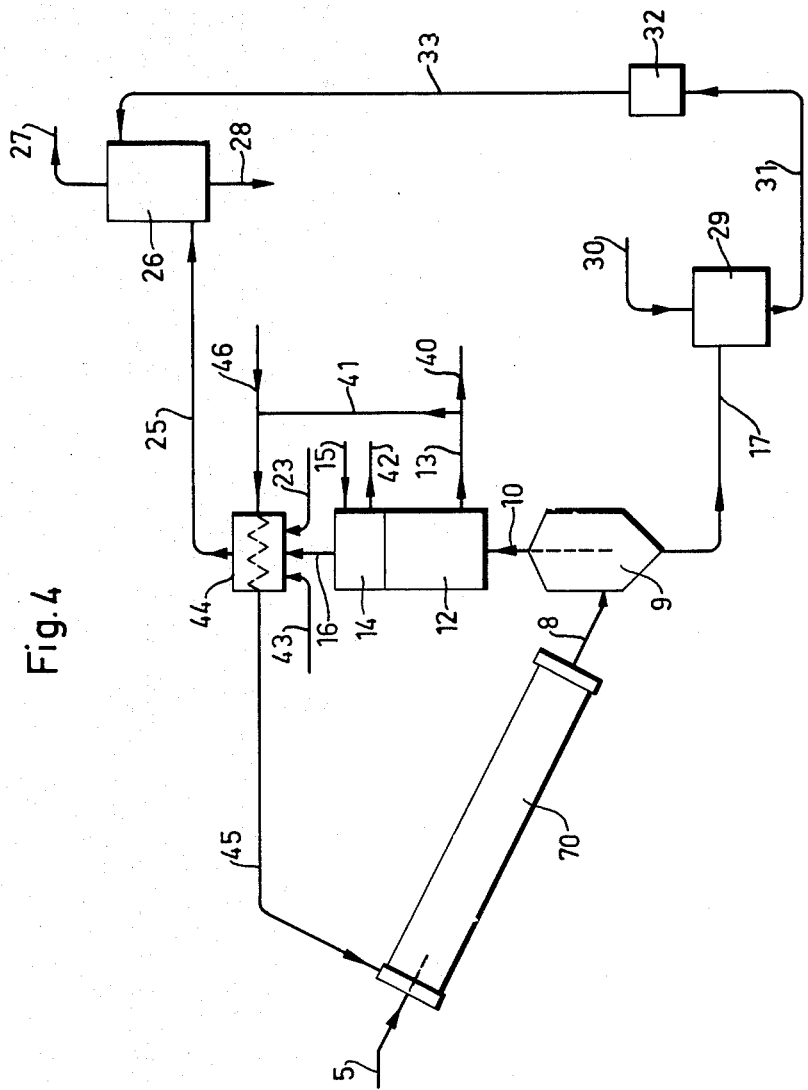

3,236,589
METHOD OF WORKING UP CELLULOSE WASTE LIQUOR CONTAINING SODIUM AND SULFUR
Rolf Bertil Reinhall, Lidingo, and Bertil Sixten Groth, Stockholm, Sweden
Filed Jan. 31, 1962, Ser. No. 188,915
Claims priority, application Sweden, Feb. 3, 1961, 1,137/61
(Filed under Rule 47(a) and 35 U.S.C. 116)
4 Claims. (Cl. 23—48)

This invention relates to a method of working up cellulose waste liquors containing sodium and sulfur.

Among the methods proposed for recovering chemicals in waste liquors from the treatment of wood and other vegetable materials with sodium sulfite solutions, evaporation of the liquor and pyrolysis of the concentrated liquor in highly disintegrated or atomized form has recently found particular attention. This method has been described inter alia in "Tappi" (The Journal of the Technical Association of the Pulp and Paper Industry), vol. 40 (1957), pp. 866–72, 41 (1958), pp. 110–116 and 312–217, and 43 (1960), pp. 678–683.

The "Atomized Suspension Technique" is defined as a new method of recovering solid matters from industrial waste liquors and simular waste liquors. When applied to waste liquor from neutral sulfite treatment, the more or less concentrated liquor is atomized in the absence of air or other foreign gases at the top of a reaction tower the walls of which are indirectly heated to a temperature in the range of 700 to 800° C. The finely divided liquid drops fall down through the tower during drying and thermal decomposition or pyrolysis of the component organic matters. The pyrolysis residue consists substantially of sodium carbonate which, however, contains some sodium sulfate, sodium thiosulfate, carbon and silicate-like matters. The major part of the sulfur passes over into the gas which is rich in carbon dioxide and hydrogen but contains, in addition, carbon monoxide, hydrogen sulfide, hydrocarbons and varying amounts of nitrogen. After separation of solid matters, tar, etc., the gas is burnt for the indirect heating of the reaction tower. Before the combustion, the sulfur in the gas may be recovered as hydrogen sulfide. If the gas is burnt without such recovery, the sulfur will be present in the flue gases as sulfur dioxide which may be extracted during formation of sulfite by a water solution of the pyrolysis residue, which consists essentially of sodium carbonate.

Among the reactions which may occur in connection with the pyrolysis, there may be mentioned: decomposition of organic matters to carbon, hydrocarbons, etc.; reactions between carbon water vapor and carbon dioxide, reduction of inorganic sulfur combinations component of the liquor, such as sulfates, sulfites and thiosulfates to sulfides by means of free carbon, carbon monoxide or hydrogen; and reaction of the sulfide formed with carbon dioxide and steam to carbonate and free hydrogen sulfide, as represented by the following equations Organic matters → C, hydrocarbons, carbon monoxide, etc.  (1)

$C + H_2O(g) \rightarrow CO + H_2 - 31.4$ kcal.  (2)

$C + CO_2 \rightleftarrows 2CO - 41.2$ kcal.  (3)

$CO + H_2O(g) \rightleftarrows CO_2 + H_2 + 9.8$ kcal.  (4)

$Na_2SO_4 + 4C \rightarrow Na_2S + 4CO - 12.5$ kcal.  (5)

$Na_2SO_4 + 4CO \rightleftarrows Na_2S + 4CO_2 - 48.5$ kcal.  (6)

$Na_2SO_4 + 4H_2 \rightarrow Na_2S + 4H_2O(g) - 6.7$ kcal.  (7)

$Na_2S + CO_2 + H_2O(g) \rightarrow Na_2CO_3 + H_2S$  (8)

Sodium sulfite and sodium thiosulfate react in an analogous way as sodium sulfate.

The temperature required for the reduction of sodium sulfate with carbon in accordance with Equation 5 varies with inter alia the activity of the carbon. In this technique anthracite powder was used previously. As this powder has a comparatively low activity, the reduction does not start to run at any appreciable velocity until towards 700° C., and it is usually completed at above 1000° C. The carbon formed by the pyrolysis of the liquor is present in an intimate mixture with the salts and is much more strongly active than the anthracite, for which reason the reduction of the sulfate may be effected at a considerably lower temperature than with anthracite. Also, hydrogen is capable of reducing the sodium sulfate at a comparatively low temperature. As disclosed in the German patent specifications Nos. 559,314 and 566,987, for example, the reduction runs at 500–850° C. if it is carried out in the presence of some iron oxide which acts as a catalyst.

Evaporation and pyrolysis by indirect heating of the atomized liquor is a very difficult technical problem on account of inter allia difficulties concerning material and a progressive deterioration of the heat transfer coefficient of the wall of the furnace by reason of the wall becoming coated with coke-like matters containing alkali. It is also hard to impart to the gas suspension the temperature necessary for the previously mentioned reactions to run as completely as possible towards the right of the equations set out hereinbefore, with satisfactory velocity. In liquors having a low calorific value, that is, liquors from production of high yield pulps (yields from 80 to more than 90 percent) the gas obtained by the pyrolysis does not suffice for heating the retort either.

One main object of the present invention is to overcome said inconveniencies and difficulties.

One main feature of the present invention is based on the observation that the desired high temperatures are attainable by direct heating of the liquor in parallel flow with, and by means of, a gas heated to a high temperature. Said gas may consist of steam, carbon dioxide, carbon monoxide, hydrogen or nitrogen or mixtures of at least two of these components.

A further object of the present invention is to produce in a cheap and rational manner a gas heated to the high temperature required, by burning in close connection with the reaction vessel a fuel preferably having a low ash content. Such fuel may be constituted by gaseous or liquid petroleum products, water gas (carbon monoxide+hydrogen), generator gas, pyrolysis gas and similar gaseous fuels. In connection with waste liquors which are rich in organic matters and consequently have comparatively high calorific values, part of the liquor may serve as fuel by being injected directly into the combustion chamber connected to the reaction vessel. Also black coal and similar fuels may be used, but because of their comparatively high ash content, some contaminating of the liquor ashes recovered must be taken into account.

The combustion may take place at deficit as well as excess air or oxygen but in the case of an excess the remaining percentage of oxygen in the gas must not be allowed to exceed the limits for a reducing atmosphere to be maintained in the reaction vessel. In some cases a predetermined content of oxygen may even be desired, as heat will be set free in the reaction mixture by partial oxidation of the liquor components, or reaction products primarily formed of said components, which lowers the requirement of additional fuel and contributes to a more uniform distribution of temperature in the reactor. On the other hand, in connection with liquors poor in organic matters, it may be advisable to perform the combustion with a deficit of oxygen in order to raise the content of reducing components in the reaction gas, such as carbon monoxide, hydrogen and free carbon.

If the combustion is conducted with oxygen or oxygen mixed with steam and/or carbon dioxide, the combustion gas will be poor in nitrogen but rich in reducing constituents. The percentage of hydrogen sulfide of the gas will be higher, which facilitates the recovery of sulfur. The flue gases freed from sulfur may be used to advantage in this case as a fuel gas, but when the content of organic matters of the liquor is low, additional fuel may be necessary for maintaining the temperature and/or reducing furnace atmosphere required.

As heat carrier and reducing gas there may also be used a typical reducing gas such as water gas (a mixture of substantially CO and $H_2$), generator gas (a mixture of carbon monoxide and nitrogen with varying amounts of hydrogen and carbon dioxide) or, in some cases, reactor gas rich in hydrogen and carbon dioxide (cf. Example 3 below). The heat carrier may also consist of steam superheated to a high temperature. The superheating may be effected in recuperators (by heat exchange through a wall) or in regenerators having stationary or travelling heating bodies.

The reactor or reactor vessel to be used in the practice of the present invention may be constructed and the waste liquor may be supplied in various ways. A vertical shaft or retort furnace may be used, in the top section of which there are various devices for introducing finely divided liquor and heating gas, which is suitably supplied tangentially. During the fall through the shaft furnace, the water in the drops will be gasified, after which the reactions previously referred to may set in. By controlling the feed of fuel, the temperature is adjusted in such a way as to prevent the ash particles from assuming such a high temperature that they tend to melt and stick to the wall of the furnace. However, the risk hereof will be far less in the direct heating according to the invention than when the heat is supplied through the wall. Sodium carbonate, sodium sulfide and sodium sulfate melt at 851, 1180 and 884° C., respectively, but as eutectic mixtures are formed, at least transiently, the temperature should be adjusted in such a way that the temperature of the ash particles does not exceed 750 to 800° C. Also, with regard to the durability of the furnace material, higher temperature should be avoided. The reactor may also be formed as an inclined rotary furnace having devices for supplying liquor and heating gas in its top section. Also, this embodiment permits introduction of the liquor in a highly disintegrated form, though the liquor may also be permitted to flow into, or may be injected into, the reactor. It will dry and pass through the furnace in a powdered or granulated state. Also in this case, the temperature must be adjusted so as to prevent the ash components from melting and adhering to the wall of the furnace.

The reactor gas is preferably conducted through a dry cyclone for separating soaring ash particles. Its heat content may be utilized in a waste heat boiler, for direct liquor concentrating and in other suitable ways familiar to an expert in the field of art in consideration. The gas may be purified of hydrogen sulfide in accordance with known methods, the clean gas may be burnt for generating heat and the hydrogen sulfide recovered may be converted into sulfur dioxide, which is caused to react with the sodium carbonate obtained in the process. The combustion may also be effected before the hydrogen sulfide is separated, and the combustion gas may be washed with a solution of the pyrolysis residue for converting the component sodium carbonate into sodium sulfite or hydrogen sulfite.

With reference to FIGS. 1–4 of the accompanying drawings the following examples will illustrate some methods of carrying out the recovery of chemicals within the scope of the present invention. In the various figures the same reference characters are used for the same or equivalent parts.

*Example 1*

A plant comprising the apparatus units required for recovering chemicals in accordance with the present invention may be disposed as is illustrated in FIG. 1. Oil and air supplied through conduits 1 and 2 are fed into a burner 3 connected to reaction tower 7. The combustion gas produced by the combustion of the oil and air in the burner 3 is introduced tangentially into the top section of the reaction tower through a conduit 4. Concentrated waste liquor is introduced centrally through a conduit 5 and an atomizing nozzle 6. The liquor mist whirls down through the reactor 7 while its ash constituents are dried, pyrolized and converted. The amount of oil burnt is controlled so as to prevent the temperature of the ash particles from surpassing 750° C., that is, said temperature is maintained below the fusion temperature of the ashes. The reaction mixture passes through a conduit 8 to a cyclone 9 wherein the ash constituents are separated in the form of a loose powder essentially consisting of sodium carbonate. The gases pass through a conduit 10 to a steam boiler 12 with associated economizer indicated at 14. The boiler is provided with a fire place for burning combustible gaseous constituents component of the gas, primarily hydrogen and carbon monoxide. The necessary air is supplied through a conduit 11. Steam is discharged through a conduit 13, feed water is supplied through a conduit 15 and the flue gas escapes through a conduit 16. Generally, the percentage of the sulfur dioxide of the gas is so low that it does not pay to recover the sulfur dioxide by washing the gas with sodium carbonate.

*Example 2*

Figure 2:
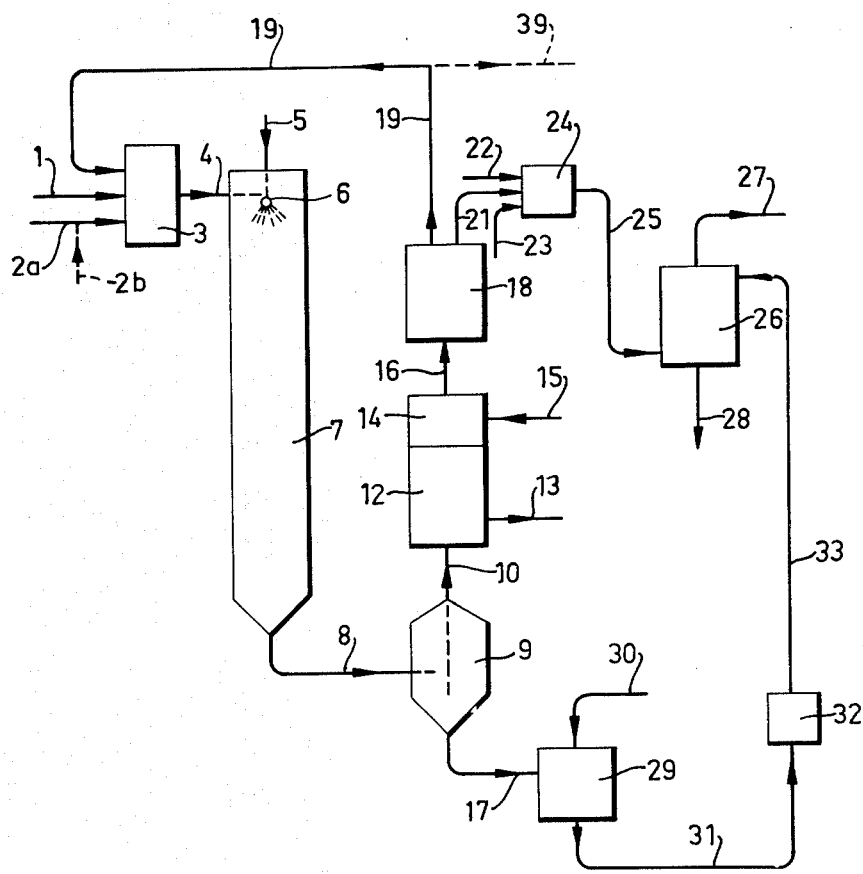

A second way of arranging the chemical recovery is illustrated in FIG. 2. Gas generated in the process and poor in nitrogen, is burnt with oxygen, if desired mixed with steam and/or carbon dioxide for lowering the combustion temperature in the burner 3. The gas, oxygen and steam are supplied through conduits 19, 2a and 2b respectively. If necessary the gas is supplemented with another fuel, e.g., fuel oil, which is supplied through the conduit 1. Combustion gas and concentrated liquor are introduced into the reaction tower 7 through conduits 4 and 5 and a nozzle 6 in the same way as is described in connection with FIG. 1. The reaction mixture from the tower 7 is conducted through a conduit 8 to the cyclone 9, wherein the ash constituents are separated. The cleaned gas passes through the conduit 10 to the waste heat boiler 12 with associated economizer 14. However, contrary to FIG. 1, no air is supplied. Steam is withdrawn from the boiler through the conduit 13 and feed water is supplied through the conduit 15. The cooled flue gas escapes through the conduit 16 to a hydrogen sulfide washer 18. The desulfurized gas is conveyed through a conduit 19 to the burner 3. Any excess gas escapes through a conduit 39. The desorption gas from the hydrogen sulfide washer 18 is conveyed through a conduit 21 to a combustion chamber 24 into which air is introduced through a conduit 22 and possible supplementary sulfur is introduced through a conduit 23. The sulfur dioxide containing gas formed in chamber 24 by combustion of the hydrogen sulfide is discharged through a conduit 25 to an absorption plant 26 wherein it is washed with a solution of soda supplied through a conduit 33. The flue gas escapes through a conduit 27 and sodium sulfite solution formed in plant 26 by reaction of the sulfur dioxide with the soda is conducted away through a conduit 28. Ashes separated in the cyclone 9, which ashes consist essentially of sodium carbonate, are conveyed through a conduit 17 to a dissolving vessel 29 to which water is supplied through a conduit 30. The solution obtained is discharged through a conduit 31, a filter 32 and the conduit 33 to the sulfur dioxide absorber 26.

*Example 3*

Figure 3:
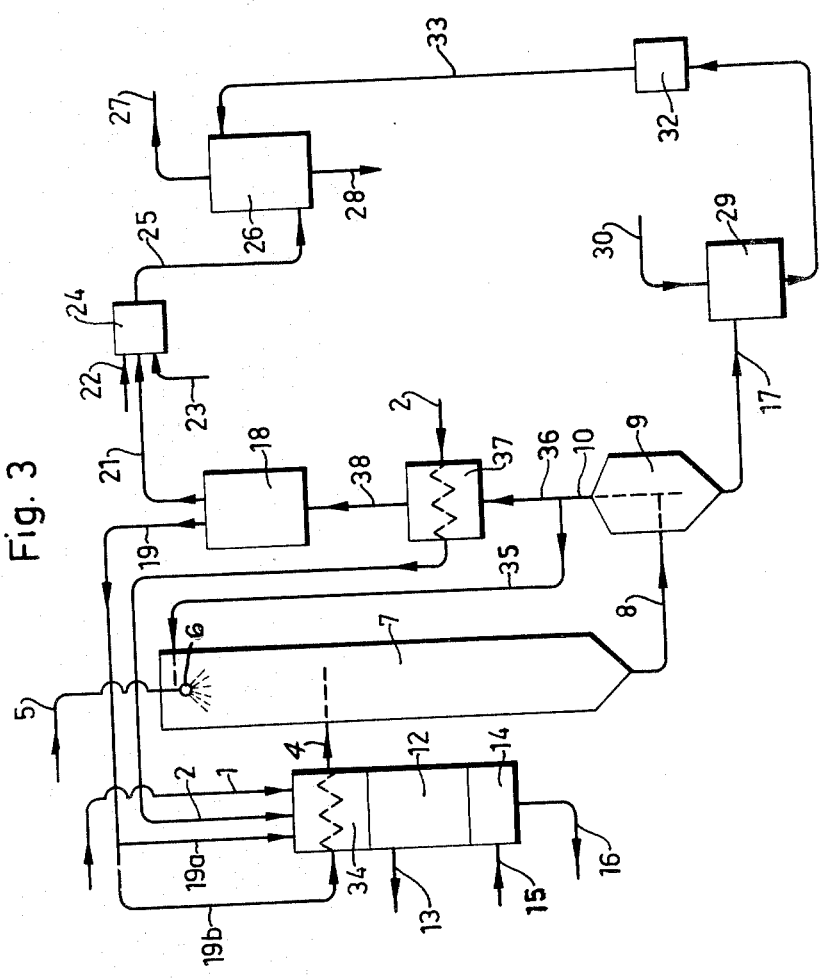

In the embodiment illustrated in FIG. 3, part of the gas generated in the process, which gas is poor in nitrogen, is used as heating gas and the remaining part is used as fuel gas for heating the heating gas. The fuel gas is introduced through a conduit 19a into a combustion chamber 34 together with preheated air arriving through the conduit 2 after having passed a heat exchanger 37. If required also oil supplied through the conduit 1 is burnt. Liquor is introduced into the top section of the reaction tower through the conduit 5 and the atomizing nozzle 6. Hot recirculated reaction gas is also supplied through a conduit 35, said gas being withdrawn from a place behind the cyclone 9. The heating gas is heated indirectly by heat exchange in the combustion chamber 34 and is introduced further down into the reactor 7 through the conduit 4 for raising the temperature to the required level. Solid constituents are separated in the cyclone 9. A determined part of the gas discharged from the cyclone is recirculated, as already stated, through the conduit 35 to the top section of the reactor. The remaining gas, i.e., the gas newly formed in the process, gives off its heat in the heat exchanger 37 to the combustion air entering through conduit 2. The cooled gas passes through a conduit 38 to the hydrogen sulfide washer 18. The desulfurized gas escapes through the conduit 19 and is utilized partly as a fuel gas (through conduit 19a) and partly as a heating gas (through a conduit 19b). The desorption gas from the hydrogen sulfide washer, which gas essentially consists of hydrogen sulfide and carbon dioxide, is discharged through the conduit 21, the combustion chamber 24 and the absorption plant 26 for further working up in accordance with the embodiment of the process illustrated in FIG. 2. Also the ashes separated in the cyclone which are discharged through the conduit 17 to the elements 29, 32 and 26 are treated in the same manner as in the embodiment according to FIG. 2.

*Example 4*

A fourth method of performing the chemical recovery within the scope of the present invention is illustrated in FIG. 4. Concentrated liquor and highly superheated steam, if desired admixed with some air, are introduced tangentially into the top section of a rotary kiln or furnace 70 through a conduit 45. Liquor is allowed to enter the furnace through the conduit 5. Gas and ashes escape through the conduit 8 to the cyclone 9. The ashes are discharged and treated as described in connection with FIGS. 2 and 3. The gas cleaned in the cyclone delivers its heat while the major part of the water is condensed in the waste heat boiler 12 and associated economizer and cooler 14. Feed water is supplied through the conduit 15, condensate is withdrawn through a conduit 42 and steam is withdrawn through the conduits 13 and 40. A part of the steam generated passes by way of a conduit 41 to a combined combustion chamber and superheater 44 and from there to the top section of the rotary furnace through the conduit 45. Air may be added to the steam through a conduit 46. The gas cooled in the economizer passes through the conduit 16 to the combustion chamber 44 wherein it is burnt with air, if desired while supplementary sulfur is being introduced. Air and sulfur are supplied through the conduits 43 and 23. The cooled flue gas containing sulfur dioxide escapes through the conduit 25 to the sulfur dioxide absorber 26 wherein it is washed with a solution of the ashes in the same way as disclosed in connection with FIG. 2.

The apparatus units referred to in the examples are only shown by way of principle and may be formed in their details and modified in many different ways. The rotary furnace shown in FIG. 4 may be introduced into the diagram shown in FIGS. 1–3 instead of the vertical tower reactor, and this may in turn be substituted for the rotary furnace of the diagram of FIG. 4. Possibly a tower reactor and a rotary furnace may be connected in series. A plurality of combinations between the various diagrams are possible, and smaller auxiliary units must of course be interposed between the main units. In certain cases it is conceivable to conduct, in the embodiments of FIGS. 3 and 4, heating gas and liquor in countercurrent in the reactor 7 or 70, respectively.

While several embodiments of the invention have been shown and described, it is to be understood that this is for purpose of illustration only, and that the invention is not to be limited thereby, but its scope is to be determined by the appended claims.

What we claim is:

1. A method of treating cellulose waste liquors containing sodium and sulfur compounds for the recovery of chemical components of said liquors, said method comprising:
   (1) thermally decomposing the liquor by directly contacting the same in a reaction zone with a preheated reducing gas flowing concurrently therewith through said zone;
   (2) separating from one another the solid and gaseous reaction products of said thermal decomposition;
   (3) removing sulfur components from said gaseous reaction products;
   (4) heating one portion of the desulfurized gaseous reaction products by indirect contact thereof with hot combustion gases, said combustion gases comprising another portion of said desulfurized gaseous reaction products;
   (5) returning said first-named portion of said indirectly heated desulfurized gaseous reaction products to said reaction zone to serve as preheated reducing gas for said thermal decomposition of the liquor in said reaction zone;
   (6) treating the hydrogen sulfide-containing gas component of said gaseous reaction product to form sulfur dioxide by combustion of said component with air;
   (7) recovering sodium carbonate from said solid reaction products; and
   (8) forming sodium sulfite solution by reacting said sulfur dioxide with said sodium carbonate.

2. A method as defined in claim 1, wherein said preheated reducing gas for the thermal decomposition of the liquor is selected from the group consisting of water vapor, carbon dioxide, carbon monoxide, hydrogen, nitrogen and mixtures thereof.

3. A method as defined in claim 1, wherein the waste liquor is introduced into said reaction zone in an atomized state.

4. A method as defined in claim 1, wherein a portion of said gaseous reaction products of said thermal decomposition is recirculated directly to said reaction zone.

References Cited by the Examiner

UNITED STATES PATENTS

| | | | |
|---|---|---|---|
| 424,756 | 4/1890 | Blackman | 23—48 |
| 1,605,927 | 11/1926 | Drewsen | 23—48 |
| 1,702,588 | 2/1929 | Bradley | 23—48 |
| 2,261,995 | 11/1941 | Greenawalt | 23—48 |
| 2,535,730 | 12/1950 | Gadret | 23—48 |
| 2,792,350 | 5/1957 | Bradley et al. | 23—48 X |
| 3,005,686 | 10/1961 | Haas | 23—48 X |
| 3,020,195 | 2/1962 | Bradley et al. | 23—48 X |
| 3,073,672 | 1/1963 | Cederquist | 23—48 |
| 3,083,077 | 3/1963 | Bjorkman et al. | 23—48 |

MAURICE A. BRINDISI, *Primary Examiner.*

GEORGE D. MITCHELL, *Examiner.*